3,255,608
LIQUID NITROGEN IMMERSION AND SPRAY
FREEZING MACHINE
Hamish K. Macintosh, Toronto, Ontario, Canada, assignor to Elmwood Liquid Products, Inc., New York, N.Y., a corporation of New York
Filed June 18, 1964, Ser. No. 376,137
4 Claims. (Cl. 62—374)

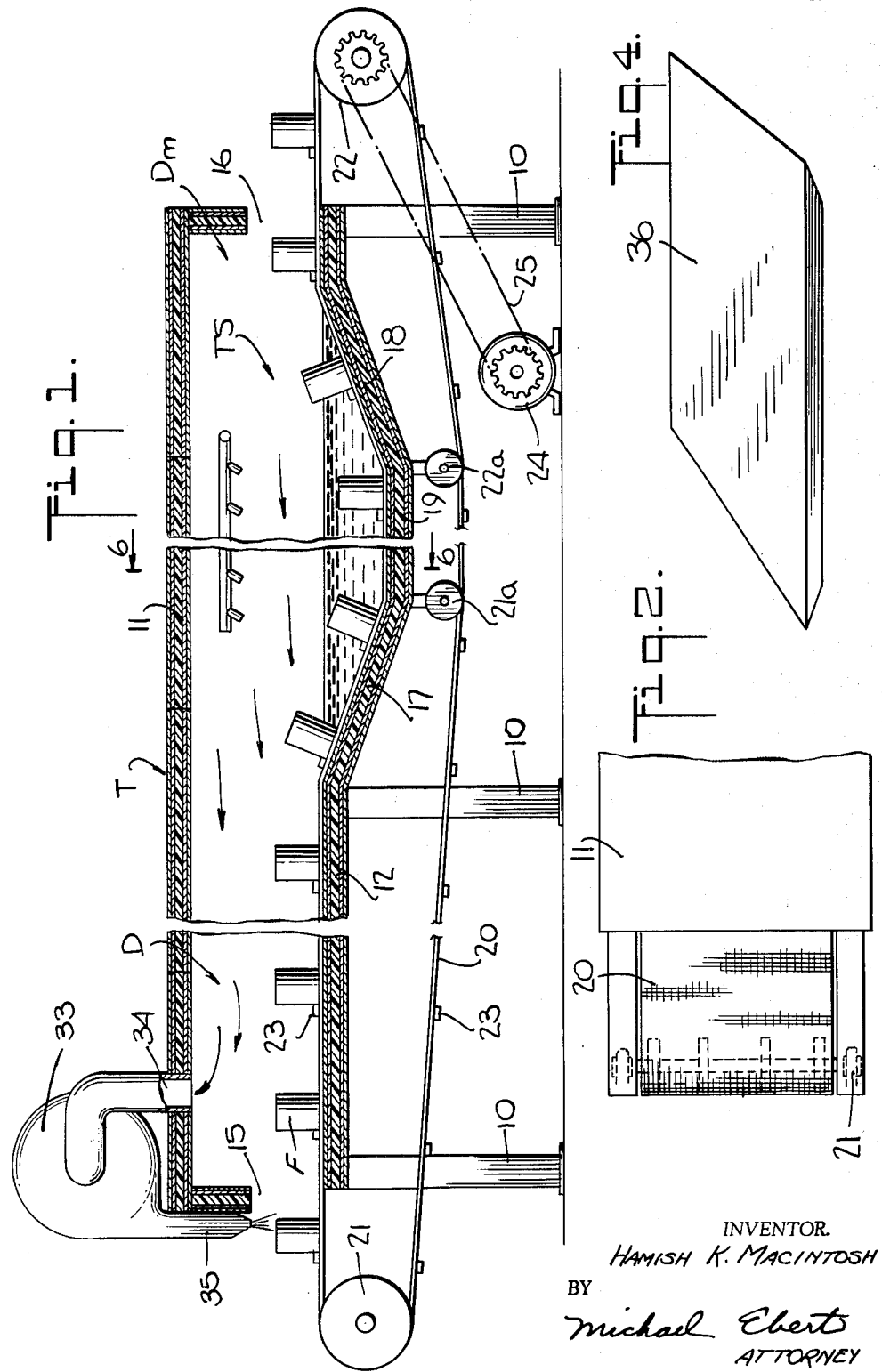

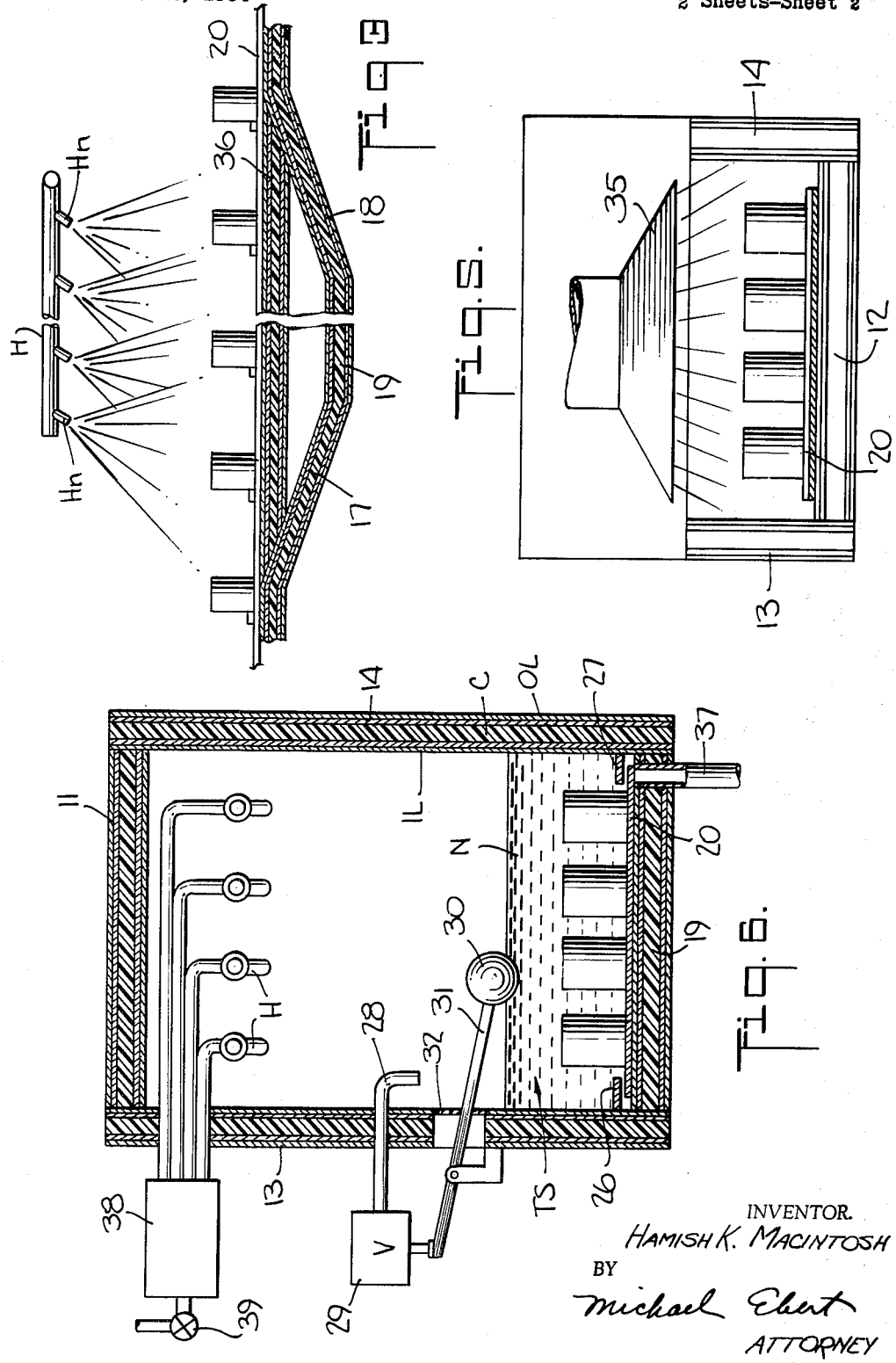

This invention relates generally to a machine for freezing perishables with liquid nitrogen, and more particularly to a dual-purpose machine adapted to spray the perishables or to immerse them in liquid nitrogen and to derive the maximum benefit from the available nitrogen in either operation. This application discloses an invention constituting an improvement over that described in my co-pending application Serial No. 280,781, filed May 16, 1963, entitled "Liquid Nitrogen Freezing System."

In the freeze-down machine disclosed in my co-pending application, food or other perishables are subjected to a spray of liquid nitrogen. This freezing agent, which is at a temperature of −320° F., acts to freeze the water and oils within food with such rapidity that no loss of freshness is experienced. The food passes the crystallization point so quickly that the flavor thereof is effectively locked in. Moreover, since the water content is retained, it prevents the food from becoming dry and flaky.

If food having a thick crust or a delicate texture is suddenly immersed in liquid nitrogen, the abrupt and extreme change in temperature may crack the crust or otherwise impair the texture of the food and render it commercially unsaleable. To avoid this drawback, the machine disclosed in my co-pending application makes use of an elongated tunnel through which food admitted at the inlet is conveyed by a continuous belt to the outlet. Disposed adjacent the outlet is a spray header which showers liquid nitrogen onto the food passing thereunder, thereby freezing the food and causing the liquid nitrogen to be boiled and volatilized. The cold nitrogen gas emanating from the sprayed food is drawn by a suction fan down the tunnel toward the inlet, thereby pre-chilling food items advancing toward the spray position.

Thus a temperature gradient is set up along the tunnel, and as the food travels from the inlet to the outlet it becomes progressively colder as it approaches the spray position. In this way the temperature of the food in the course of travel undergoes a rapid transition rather than an abrupt change. At the same time, optimum use is made of liquid nitrogen, waste being minimized and shock freezing avoided.

The main object of the present invention is to provide an improved freeze-down machine which is capable of immersing as well as spraying food. While certain foods, such as pies, fruits and vegetables, fish and other items having a delicate texture or fine crust are best frozen by spray techniques, other foods such as poultry and beef having substantial bulk or mass, or protectively packaged foods, are more effectively frozen by immersion. In general, whether a product is best immersed or sprayed depends on its bulk, density, texture and other composition factors which determine whether the product can withstand immersion or can only tolerate spraying.

Since pre-cooling and maximum exploitation of liquid nitrogen are desirable, whether the food is immersed or sprayed, it is a more specific object of the present invention to provide a machine in which food is conveyed through an elongated tunnel by a belt which is adjustable to carry the food into an immersion bath or under a spray header disposed adjacent the tunnel outlet. The volatilized nitrogen is drawn by a fan from the spray position or from the bath, depending on which technique is used, down the tunnel toward the inlet direction to progressively pre-cool the advancing food.

In a machine in accordance with the invention, both the inlet and outlet communicate with the atmosphere and are exposed to ambient temperature. In the absence of a mechanical air lock, there is a tendency for the warmer atmosphere to be drawn into the tunnel, particularly at the inlet. This tendency is minimized at the outlet adjacent the immersion bath or spray header, whichever is operative, since the volatilization of the liquid nitrogen and the resultant gaseous expansion in this region function to expel warm air at the outlet. However, at the open inlet the suction forces acting to draw the volatilized nitrogen down-stream from the outlet area, also serve to draw in warm air at the inlet, with a resultant intermingling of warm air and cold gas. While this effect can be avoided by mechanical gas locks at the inlet, such locks necessarily complicate the structure, for the conveyance of the food must then be coordinated with the operation of the locks.

Accordingly, it is another object of the invention to provide a suction system for drawing nitrogen gas down the tunnel in countercurrent relation with the movement of food therein, the suction system discharging the cold gas across the inlet to create a gaseous curtain effectively blocking the influx of relatively warm air. A significant advantage of the cold gaseous curtain is that it not only blocks the entry of warm air, but also pre-chills the food even before it is admitted into the tunnel.

Also an object of the invention is to provide a continuous conveyor for a tunnel having both a spray header and an immersion trough therein, the conveyor being adapted to travel either along the surface of the trough to effect immersion of food conveyed thereon, or to skip over the trough and to subject the food to the spray action of the header.

Still another object of the invention is to provide a machine of the above-described type wherein the level of the liquid nitrogen in the trough is maintained at a substantially constant level.

Briefly stated, these objects are accomplished in a dual-purpose freeze-down machine having an elongated, thermally insulated tunnel, the outlet portion of which is dropped to define an immersion trough having sloping end walls and a bed. Looped through said tunnel is an endless belt, the upper section of which is slidable along the bottom surface of the tunnel, as well as the surface of said trough, whereby food conveyed therein is conducted from the inlet of the tunnel along the surface of the trough to the outlet, whereby the food may be frozen by immersion.

A hatch member is provided to close the trough, whereby the conveyor belt may alternatively be caused to travel over said trough and under a spray header adapted to spray liquid nitrogen over the food. A suction device acts to draw cold nitrogen, volatilized either as a result of spraying or immersion of the food, in the direction of the inlet in counterflow relationship with the movement of the food on the conveyor to effect progressive precooling thereof, the suction device extracting the cold gas laterally from the tunnel at a position adjacent the inlet and discharging the gas across the inlet to create a gaseous curtain effectively blocking the influx of warm air into the tunnel.

For a better understanding of the invention, as well as other objects and further features thereof, reference is made to the following detailed description to be read in conjunction with the accompanying drawings, wherein:

FIG. 1 illustrates in longitudinal section a freeze-down machine in accordance with my invention;

FIG. 2 is a partial plan view of the outlet portion of the machine;

FIG. 3 is a fragmentary showing of the same machine, showing it in operation as a spray unit;

FIG. 4 is a perspective view of the hatch piece for closing the immersion trough;

FIG. 5 is an end view of the machine at the inlet side; and

FIG. 6 is a section taken along line 6—6 of FIG. 1.

Referring now to the drawings, the freeze-down machine in accordance with the invention includes an elongated, open-ended tunnel structure T having a main duct section D of generally rectangular cross-section, followed by a trough section TS, and terminating in a minor duct section $D_m$. The tunnel structure is supported horizontally on standards 10. The entire tunnel structure is constituted by thermally insulated top and bottom walls 11 and 12 and side walls 13 and 14, the open inlet being identified by numeral 15 and the open outlet by numeral 16. The bottom wall 12 in the region adjacent outlet 16 and the related portions of side walls 13 and 14 are dropped to create the immersion trough section TS which is defined by inclined end walls 17 and 18 joining a horizontal bed wall 19, whereby the longitudinal sectional configuration of the trough is trapezoidal.

The various walls constituting the tunnel structure are formed, as best seen in FIG. 6, by an outer liner OL and an inner liner IL with an insulated panel C interposed therebetween. The liners are preferably of metallic construction, whereas the panel C is composed of laminated plywood sheets having a core of foam polyurethane plastic material or other suitable thermal insulation having a high "K" factor. The outer liner may be formed of aluminum sheets, whereas the inner liner IL for both the tunnel and trough sections is preferably fabricated of steel plates welded together into a single unit, which unit is spaced from the outer liner OL by the plastic panel C but is otherwise mechanically disconnected therefrom, whereby the inner liner effectively floats within the outer liner.

Inasmuch as the inner liner is subjected to cryogenic temperatures and the outer liner is exposed to ambient temperatures, the inner liner tends to contract, hence it is important that it be free to do so independently of the outer liner, otherwise the entire structure will be subjected to warping forces. The top wall 11 is constructed of removable sections which are attached to the tunnel structure by gaskets (not shown) formed of neoprene or other spongelike material which is compressed by the weight of the top wall to form an hermetic seal.

To convey perishables through the tunnel and the immersion trough section, there is provided a continuous belt 20 which is looped through the tunnel and supported by sprocket wheels 21 and 22, one located adjacent the inlet and the other adjacent the outlet. In practice, sprocket wheel 21 may be disposed about three feet from inlet 15, thus defining a moving feed-in table, while sprocket wheel 22 is spaced about three feet from outlet 16, thus defining a moving take-off table. The exterior portion of the belt 20 runs over idler wheels 21a and 22a rotatably mounted below the trough.

To facilitate the conveyance of perishables, pusher lugs 23 may be welded to the belt at spaced positions therealong to provide a series of partitioned areas accommodating food items F and conveying them through the major duct D of the tunnel, downwardly into the trough section TS, and upwardly therefrom, and finally through the minor duct section $D_m$.

Belt 20 is driven by a suitable variable-speed motor 24 linked by chain 25 to sprocket wheel 22 whereby the speed of conveyance may be readily adjusted. The belt is preferably of the link-chain steel type whose size can be adjusted readily by removing or adding links thereto. It is also possible to use non-metallic belts formed, for example, of a Teflon-coated fiberglass web whose ends may be laced together at different positions to adjust the overall length of the belt.

While the upper portion of the conveyor belt 20 travels through the tunnel and trough, frost is not permitted to build up on the conveyor, for the lower portion of the belt passes outside of the tunnel where it is exposed to ambient temperature before being returned to the tunnel. However, to prevent the belt from becoming excessively warm before it is returned into the tunnel, the outside portion of the belt may be enclosed by insulating panels (not shown).

As the belt slides along the bottom wall 12 of the tunnel and goes down inclined wall 17 and then along bed wall 19 and up inclined wall 18 of the trough section, it is held to these trough wall surfaces by means of stainless steel strips 26 and 27 attached to side walls 13 and 14 at positions directly above and parallel to the belt. Preferably, the bottom surfaces of these strips have Teflon attached thereto to minimize abrasive wear which would otherwise occur with metal-to-metal contact. Similarly, in practice, the interior surfaces IL of bottom wall 12 and the walls 17, 18 and 19 of the trough may be lined with Teflon strips or an equivalent hard and smooth plastic material, whereby the belt 20 is in sliding contact therewith rather than with the metal inner liner IL.

Liquid nitrogen is fed into trough TS from a suitable storage tank through a pipe 28 having a solenoid valve 29 interposed therein. The operation of valve 29 is controlled by a float 30 having a pivoted arm 31 extending through a flexible Teflon-covered port 32 in side wall 14. The Teflon diaphragm maintains the thermal seal while permitting movement of arm 31.

Float 30 lies on the surface of the liquid nitrogen bath N in trough TS, the float riding up and down as the level of the bath changes. Arm 31, which changes its angular position as the float is raised or lowered, is arranged to actuate the switch of the solenoid valve 29 when the level of the bath is below a pre-set value. In this way, as liquid nitrogen is volatilized and the float on the bath falls with the level of the liquid nitrogen, arm 31 causes actuation of valve 29 to replenish the volatilized nitrogen until the desired level is again attained.

Referring now to FIG. 5, showing the inlet side of the machine, it will be seen that four rows of food items are fed into the tunnel. It will be assumed that these items are of a character requiring freezing by immersion. The unfrozen food items are placed on the feed-in table of the conveyor belt manually or by automatic means, and at the outlet are picked off at the take-off table in the frozen state. The immersion trough section TS constitutes the freezing zone of the tunnel, whereas the elongated major duct section D in advance of the freezing zone constitutes the pre-freezing zone.

When the food passes through the immersion bath in heat-exchange relationship with the liquid nitrogen therein, liquid nitrogen is cold-boiled and volatilizes to generate a cold gas which rises from the bath. This gas is drawn in countercurrent relationship to the advance of the food along the tunnel in the direction of inlet 15. This is accomplished by means of one or more suction fans 33 having an input 34 which extends through the top wall 11 and communicates with the tunnel adjacent inlet 15. In practice, it is desirable to use at least two fans and by damper control to alternate the flow of nitrogen therethrough to permit one fan to defrost while the other is subjected to cold nitrogen.

The nitrogen gas drawn from the tunnel by the suction fan 33 is discharged across the inlet 15 by means of an outlet duct 35. Outlet duct 35, which is fan-shaped, is adapted to blow the cold gas across the entire inlet, thereby forming a curtain of cold gas which effectively blocks the influx of warm air. This curtain of gas, which effectively serves as a gas lock, also makes contact with the unfrozen food on the input table of the conveyor belt 20 and to that extent, acts to pre-cool the food even before it enters the tunnel.

Thus, in operation, unfrozen food placed on the conveyor, before it actually enters the inlet, is subjected to a blast of cold nitrogen gas, and after it enters the inlet it is cooled by the cold gas drawn down the tunnel in the pre-cooling zone. Consequently, as the food advances along the tunnel it is progressively lowered in temperature until it reaches the freezing zone where it is completely immersed in liquid nitrogen and further reduced in temperature to a point well below the freezing point.

In an actual embodiment of the invention, the pre-cooling zone, which is the major duct section D in advance of the trough section, is 16 feet in length, the first inclined wall which has a slope of 20°, is 5 feet in length, the bed 19 is 8 feet in length, and the second inclined wall, which also has a 20° slope, is 5 feet in length. The depth of the trough is 22 inches, with between 12 and 15 inches of nitrogen therein. The remaining minor duct section $D_m$ of the tunnel preceding the outlet, is 3 feet in length, so that upon reaching the top of the incline, the food travels this distance before emerging from the outlet. The fact that almost full utilization is made of the liquid nitrogen is made evident by the fact that while the temperature of the liquid in the bath is —320° F., by the time it is expelled at discharge outlet 35, it is at about —50° F.

As indicated previously, there are some situations in which it is preferable to spray the food rather than to immerse it. In order to accomplish this purpose in the same machine, there is provided a hatch member 36 (FIGS. 2 and 3) whose ends are inclined to match the inclination of the inclined end walls 17 and 18 of the trough section TS. The hatch section is made of the same materials as the walls, and includes an insulation panel C. To close the trough section TS, the liquid nitrogen N is first drained therefrom through drain pipe 37 (FIG. 5) and returned to the storage tank. After removing the conveyor belt 20 and one of the sections of top wall 11, the hatch member 36 is positioned to cover the trough, as shown in FIG. 3, the hatch fitting into place. The belt is then shortened to a size appropriate to the path excluding the trough. Thus with the hatch piece in place, the major and minor duct sections are interconnected across the closed trough section, which then assumes the dimensions of the ducts.

Spraying is effected by a group of headers H, each provided with a series of nozzles $H_n$ from which liquid nitrogen is ejected in the zone path aligned with a food row. Since four rows are shown, four headers are provided, although it will be obvious that any desired number of rows and corresponding headers may be used in practice. The several headers are coupled to a common manifold 38 which is supplied with liquid nitrogen from a suitable tank through a control valve 39.

The spray is adjusted relative to the quantity and temperature of the food passing thereunder and to the rate of passage, whereby susbtantially all of the liquid nitrogen is boiled and volatilized in the course of freezing to produce cold nitrogen gas. Preferably the conversion to gas occurs immediately upon contact with the food to prevent drip effects. Obviously, the hotter the food in its initial state and the larger the quantities thereof, the more liquid nitrogen must be used for a given conveyor speed. By proper adjustment of conveyor speed and the flow of liquid nitrogen, optimum freezing conditions may be achieved for any given food load.

While there has been shown and disclosed a preferred embodiment of the invention, it will be obvious that many changes may be made therein without departing from the essential scope of the invention as defined in the following claims.

What I claim is:

1. A freeze-down machine comprising an elongated tunnel having an inlet and an outlet, said inlet leading into a duct section communicating with an open trough section adjacent said outlet and containing a bath of a volatile liquid coolant, liquid coolant spray means disposed in said tunnel above said trough section, a hatch member disposed over said bath and under said spray means to close said trough section and thereby extending said duct section thereover, said hatch member being removable to open said trough section, and conveyor means selectively adapted in one operative position to convey food from said inlet through said duct section and then through said open trough section to said outlet, and in another operative position to convey food from said inlet over said hatch member under said spray means to said outlet.

2. A freeze-down machine comprising an elongated tunnel having an inlet and an outlet, said inlet leading into a duct section communicating with an open trough section adjacent said outlet and containing a bath of a volatile liquid coolant, liquid coolant spray means disposed in said tunnel above said trough section, a hatch member disposed over said bath and under said spray means to close said trough section and thereby extending said duct section thereover, said hatch member being removable to open said trough section, conveyor means selectively adapted in one operative position to convey food from said inlet through said duct section and then through said open trough section to said outlet, and in another operative position to convey food from said inlet and over said hatch member under said spray means to said outlet, and suction means to draw coolant gas volatilized when food makes contact with liquid coolant down toward said inlet to pre-chill food advancing toward said outlet.

3. A freeze-down machine selectively adapted for spraying or immersing perishables with liquid nitrogen, said machine comprising an elongated tunnel structure having an inlet feeding into a major duct section followed by a depressed trough section for containing a bath of liquid nitrogen and then by a minor duct section terminating in an outlet, a hatch piece disposed over said bath to close said trough section to interconnect said major and minor duct sections, said hatch piece being removable to open said trough section, a liquid nitrogen spray header mounted in said tunnel above said trough section, and a continuous conveyor belt looped through said tunnel structure, said belt being adjustable to function in one operative position to convey perishables from said inlet through said major duct section and through said trough section to immerse said perishables therein and through said minor duct section to said outlet and to function in a second operative position to convey perishables from said inlet through said major duct section and over said hatch piece under said spray means to said outlet.

4. A freeze-down machine selectively adapted for spraying or immersing perishables with liquid nitrogen, said machine comprising an elongated tunnel structure having an inlet feeding into a major duct section followed by a depressed trough section for containing a bath of liquid nitrogen and then by a minor duct section terminating in an outlet, a hatch piece disposed over said bath and under said spray means to close said trough section to interconnect said major and minor duct sections, said piece being removable to open said trough section, a liquid nitrogen spray header mounted in said tunnel above said trough section, a continuous conveyor belt looped through said tunnel structure, said belt being adjustable to function in one operative position to convey perishables from said inlet through said major duct section and through said trough section to immerse said perishables therein and through said minor duct section to said outlet and to function in a second operative position to convey perishables from said inlet through said major duct section and over said hatch piece under said spray means to said outlet, and a suction fan communicating laterally with said tunnel structure adjacent said inlet to draw nitrogen gas from the outlet toward said inlet to pre-chill perishables advancing toward said outlet.

References Cited by the Examiner

UNITED STATES PATENTS

| | | | |
|---|---|---|---|
| 2,447,249 | 8/1948 | Hill | 62—375 X |
| 2,484,297 | 10/1949 | Klein | 62—330 |
| 2,951,353 | 9/1960 | Morrison | 62—375 |

EDWARD J. MICHAEL, *Primary Examiner.*